(12) United States Patent
Felipe et al.

(10) Patent No.: US 10,882,771 B2
(45) Date of Patent: Jan. 5, 2021

(54) USE OF PHOSPHINO POLYMER AND POLYHYDROXYPOLYCARBOXYLIC ACID AS CORROSION INHIBITOR

(71) Applicant: Baker Hughes, a GE company, LLC, Houston, TX (US)

(72) Inventors: Mary Jane Legaspi Felipe, Sugar Land, TX (US); David N. Fulmer, Missouri City, TX (US); Bing Bing Guo, Missouri City, TX (US); Khac Truc Nguyen, Houston, TX (US)

(73) Assignee: Baker Hughes, a GE company, LLC, Houston, TX (US)

( * ) Notice: Subject to any disclaimer, the term of this patent is extended or adjusted under 35 U.S.C. 154(b) by 424 days.

(21) Appl. No.: 15/000,490

(22) Filed: Jan. 19, 2016

(65) Prior Publication Data

US 2016/0229726 A1 Aug. 11, 2016

Related U.S. Application Data

(60) Provisional application No. 62/113,072, filed on Feb. 6, 2015.

(51) Int. Cl.
*C02F 5/14* (2006.01)
*C23F 11/173* (2006.01)
(Continued)

(52) U.S. Cl.
CPC .................. *C02F 5/14* (2013.01); *C02F 5/10* (2013.01); *C09K 15/322* (2013.01);
(Continued)

(58) Field of Classification Search
CPC ........................................................ C02F 5/14
See application file for complete search history.

(56) References Cited

U.S. PATENT DOCUMENTS

| 2,953,595 A | 9/1960 | Rauhut et al. |
| 3,660,314 A | 5/1972 | Vandenberg et al. |
| (Continued) | | |

FOREIGN PATENT DOCUMENTS

| EP | 0245557 A2 | 11/1987 |
| EP | 0459171 B1 | 12/1993 |
| WO | 2010051141 A1 | 5/2010 |

OTHER PUBLICATIONS

Gallup, et al., Investigations of organic inhibitors for silica scale control from geothermal brines-II, Geothermics, 35, pp. 756-771, 2005.

(Continued)

*Primary Examiner* — Peter Keyworth
(74) *Attorney, Agent, or Firm* — Jones Wilson Jones; Jones Delfache LLP

(57) ABSTRACT

A polyhydroxypolycarboxylic acid and a water soluble phosphino polycarboxylate may be added to an aqueous system, such as a cooling water system, in order to inhibit corrosion as well as the deposition of corrosion within the system. The water soluble phosphino polycarboxylate may be derived from a phosphinyl unsaturated monomer and an ethylenically unsaturated carboxylic acid monomer. The aqueous system may be a cooling water system such as a cooling tower, a closed cooling water system, an air-conditioning water systems, a wastewater treatment system as well as a deionized water production system.

18 Claims, 3 Drawing Sheets

(51) Int. Cl.
    *C23F 11/10*    (2006.01)
    *C02F 5/10*    (2006.01)
    *C09K 15/32*    (2006.01)
    *C23F 11/167*    (2006.01)
    *C02F 103/02*    (2006.01)

(52) U.S. Cl.
    CPC ............ *C09K 15/324* (2013.01); *C23F 11/10* (2013.01); *C23F 11/167* (2013.01); *C23F 11/173* (2013.01); *C02F 2103/023* (2013.01); *C02F 2303/08* (2013.01); *C02F 2303/22* (2013.01)

(56) References Cited

U.S. PATENT DOCUMENTS

| | | | |
|---|---|---|---|
| 4,046,707 A | 9/1977 | Smith et al. | |
| 4,105,551 A | 8/1978 | Smith et al. | |
| 4,778,655 A | 10/1988 | Greaves | |
| 5,567,761 A | 10/1996 | Song | |
| 6,148,913 A | 11/2000 | Collins | |
| 6,173,780 B1 | 1/2001 | Collins et al. | |
| 6,585,933 B1 * | 7/2003 | Ehrhardt | C23F 11/08 252/180 |
| 7,306,035 B2 | 12/2007 | Collins et al. | |
| 7,417,010 B2 | 8/2008 | Collins | |
| 7,419,938 B2 | 9/2008 | Collins | |
| 8,664,418 B2 | 3/2014 | Hill et al. | |
| 2010/0111756 A1 | 5/2010 | Crovetto et al. | |
| 2010/0111757 A1 | 5/2010 | Pierce et al. | |
| 2014/0360630 A1 | 12/2014 | Arnold et al. | |
| 2015/0004054 A1 | 1/2015 | Richardson et al. | |
| 2015/0376041 A1 | 12/2015 | Felipe et al. | |
| 2015/0376799 A1 | 12/2015 | Felipe et al. | |

OTHER PUBLICATIONS

PCT/US2016/016337 Int'l Search Report and the Written Opinion of the Int'l Searching Authority, or the Declaration, Korean Intellectual Property Office, dated Jul. 1, 2016.

* cited by examiner

USE OF PHOSPHINO POLYMER AND POLYHYDROXYPOLYCARBOXYLIC ACID AS CORROSION INHIBITOR

This application claims the benefit of U.S. patent application Ser. No. 62/113,072, filed on Feb. 6, 2015, herein incorporated by reference.

FIELD OF THE DISCLOSURE

Corrosion is inhibited in an aqueous system by the addition of a polyhydroxypolycarboxylic acid and a phosphino polymer to the aqueous system.

BACKGROUND OF THE DISCLOSURE

Aqueous systems enable the removal of heat from one medium to another medium. A cooling tower is a heat rejection device which extracts waste heat to the atmosphere through the cooling of a water stream to a lower temperature. Cooling towers either use the evaporation of water to remove process heat and cool the working fluid to near the wet-bulb air temperature or, in the case of a closed circuit dry cooling towers, rely solely on air to cool the working fluid to near the dry-bulb air temperature. Common applications include cooling the circulating water in oil refineries, petrochemical and other chemical plants, thermal power stations and power plants, steel mills, natural gas processing plants, food processing plants, semi-conductor plants as well as HVAC systems.

The tendency of a system to corrode is affected by water temperature. While corrosion has been a problem to water systems for years, the potential for corrosion has increased as industries operate in more corrosive environments.

Corrosion can be defined as the destruction of a metal by chemical or electrochemical reaction with its environment. In cooling systems, corrosion causes two basic problems. The first is the failure of equipment which often requires the equipment to be replaced. The second is decreased plant efficiency due to loss of heat transfer, often the result of heat exchanger fouling caused by the accumulation of corrosion products. If left unattended, corrosion may result in failure or destruction of the metal, causing the particular water system to be shut down until the necessary repairs can be made.

Surface pitting is often evident of corrosion in the aqueous system. Pitting occurs when anodic and cathodic sites become stationary due to large differences in surface conditions. Once a pit is formed, the solution inside it is isolated from the bulk environment and becomes increasingly corrosive with time. The high corrosion rate in the pit produces an excess of positively charged metal cations, which attract chloride anions. In addition, hydrolysis produces $H^+$ ions. The increase in acidity and concentration within the pit promotes even higher corrosion rates, and the process becomes self-sustaining.

In addition to surface pitting, corrosion in cooling water systems is evidenced by rusting, embrittlement and loss of metal. Corrosion has thus proven deleterious to the overall efficiency of the system.

In the past, zinc has been used to inhibit corrosion of metals, and soluble zinc salts are ingredients of many corrosion treatment programs. Unfortunately, zinc salts, oxides and sulfates often precipitate in cooling water. In alkaline waters, particularly above about pH 7.5, dissolved zinc, tends to deposit or drop out. Thus, zinc salts are known to be unstable in neutral or alkaline water. Scale formation further typically results from the metals in inorganic corrosion inhibitors. For instance, zinc scales typically form by use of zinc containing corrosion inhibitors. The effectiveness of the corrosion inhibitor in the aqueous system thus significantly decreases.

Interest recently has focused on corrosion inhibitors which contain only organic components. Organic corrosion inhibitors typically can be used over a wider range of pH values. In addition, organic corrosion inhibitors typically provide a film which enables a more uniform corrosion attack. In addition, organic corrosion inhibitors tend to increase the activation energy on the metal surface (passivation). Further, organic corrosion inhibitors are more environmentally friendly since they do not promote heavy metal discharge during blow down.

It should be understood that the above-described discussion is provided for illustrative purposes only and is not intended to limit the scope or subject matter of the appended claims or those of any related patent application or patent. Thus, none of the appended claims or claims of any related application or patent should be limited by the above discussion or construed to address, include or exclude each or any of the above-cited features or disadvantages merely because of the mention thereof herein.

Accordingly, there exists a need for improved compositions for inhibiting or preventing corrosion in cooling water systems which are more effective and are more environmentally acceptable compositions. It is also desirable for the compositions to be compatible with other additives present in the cooling water systems.

SUMMARY OF THE DISCLOSURE

In an embodiment of the disclosure, a corrosion inhibitor system is provided for use in an aqueous water system, such as a cooling water system. The corrosion inhibitor system includes a polycarboxylic acid and a phosphino polymer such as a water soluble phosphino polycarboxylate. The polycarboxylic acid is a polyhydroxypolycarboxylic acid, such as polyhydroxydicarboxylic acid, polyhydroxytricarboxylic acid or a mixture thereof.

In an embodiment, the water soluble phosphino polycarboxylate may be derived from a phosphinyl unsaturated monomer and an ethylenically unsaturated carboxylic acid monomer.

In a specific embodiment, the phosphino polycarboxylate constitutes at least one pendant group of a phosphinyl unsaturated monomer attached to a homopolymer or copolymer of an ethylenically unsaturated acid monomer.

In another specific embodiment, the phosphinyl unsaturated monomer is within the backbone of a homopolymer or copolymer of an ethylenically unsaturated acid monomer.

In another specific embodiment, the water soluble phosphino polycarboxylate is derived from an acrylic acid, methacrylic acid, lactic acid, maleic acid, maleic anhydride or a dicarboxylic acid of itaconic acid, fumaric acid, mesoconic acid, citraconic acid or tartaric acid or a monoester of the dicarboxylic acid with $C_1$-$C_8$ alkanol, or a combination thereof.

In another specific embodiment, the water soluble phosphino polycarboxylate is derived from a phosphinyl acrylate or phosphinyl methacrylate.

In another specific embodiment, the polyhydroxydicarboxylic acid is saccharic acid, citric acid, tartaric acid, mucic acid, gluconic acid or a combination thereof.

In another embodiment, a method of inhibiting corrosion in a cooling water system is provided. In this embodiment, a polyhydroxypolycarboxylic acid of polyhydroxydicarboxylic acid, polyhydroxytricarboxylic acid or a mixture thereof and a water soluble phosphino polymer such as a water soluble phosphino polycarboxylate is added to the water system. The polyhydroxypolycarboxylic acid and water soluble phosphino polymer may be added to the cooling water system at the same time. In another embodiment, either the polyhydroxypolycarboxylic acid is added to the cooling water system prior to the addition of the water soluble phosphino polymer. In still another embodiment, the water soluble phosphino polymer is added to the cooling water system prior to the addition of the polyhydroxypolycarboxylic acid.

In another embodiment, the deposition of scales in a cooling water system is inhibited by use of the corrosion inhibition system described herein.

Accordingly, the present disclosure includes features and advantages which are believed to enable it to advance corrosion inhibition in a cooling water system. Characteristics and advantages of the present disclosure described above and additional features and benefits will be readily apparent to those skilled in the art upon consideration of the following detailed description of various embodiments and referring to the accompanying drawings.

BRIEF DESCRIPTION OF THE DRAWINGS

The following figures are part of the present specification, included to demonstrate certain aspects of various embodiments of this disclosure and referenced in the detailed description herein.

DETAILED DESCRIPTION OF THE PREFERRED EMBODIMENTS

Figure 1:
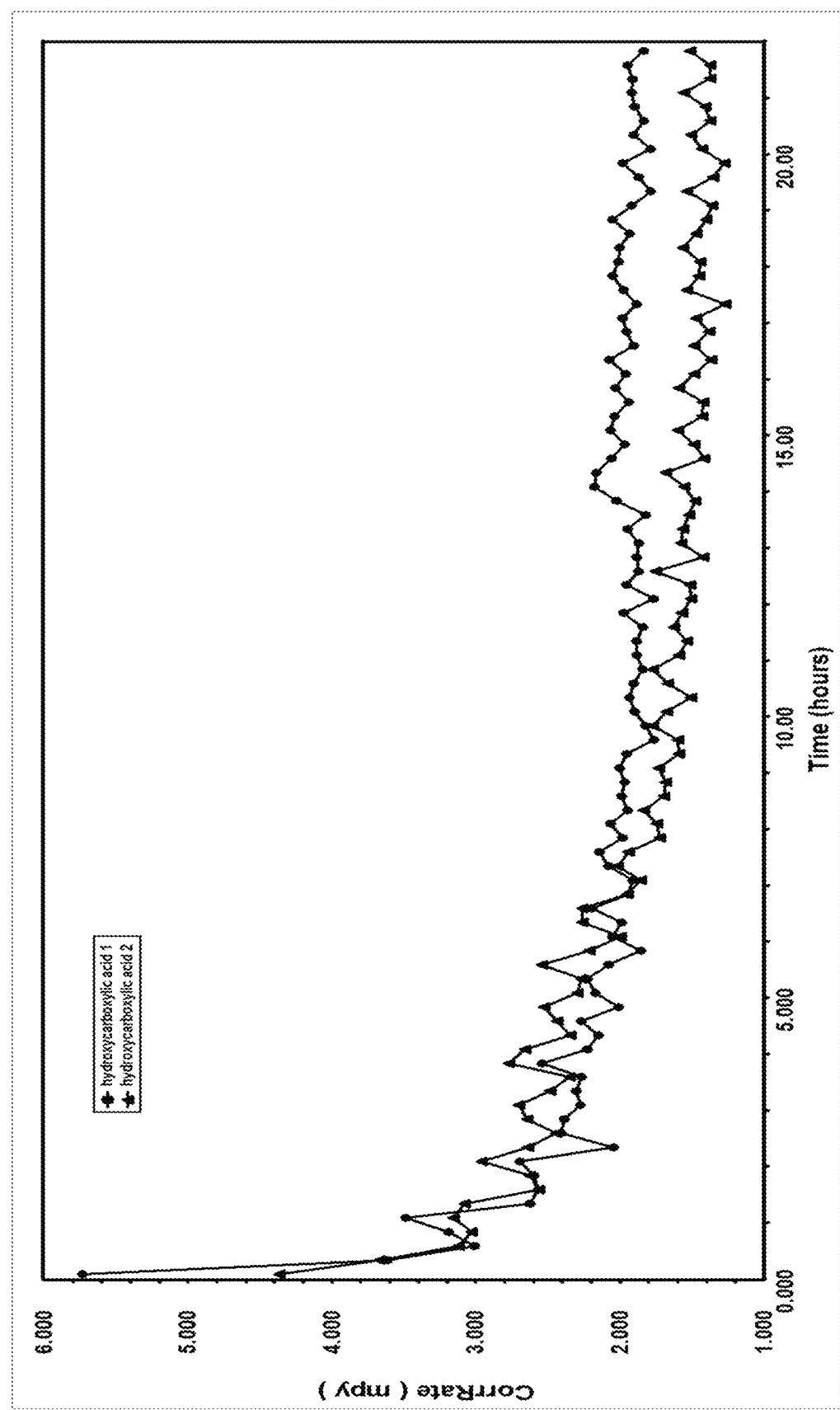
FIG. 1 is a graph illustrating the corrosion rates of formulations containing different polyhydroxypolycarboxylic acids (mucic acid and saccharic acid).

Characteristics and advantages of the present disclosure and additional features and benefits will be readily apparent to those skilled in the art upon consideration of the following detailed description of exemplary embodiments of the present disclosure and referring to the accompanying figures. It should be understood that the description herein and appended figures, being of example embodiments, are not intended to limit the claims of this patent or any patent or patent application claiming priority hereto. On the contrary, the intention is to cover all modifications, equivalents and alternatives falling within the spirit and scope of the claims. Many changes may be made to the particular embodiments and details disclosed herein without departing from such spirit and scope.

As used herein and throughout various portions (and headings) of this patent application, the terms "disclosure", "present disclosure" and variations thereof are not intended to mean every possible embodiment encompassed by this disclosure or any particular claim(s). Also, the terms "including" and "comprising" are used herein and in the appended claims in an open-ended fashion, and thus should be interpreted to mean "including, but not limited to . . . ."

Corrosion to a metal surface within an aqueous system within the aqueous system may be decreased or inhibited by adding to the aqueous system a corrosion inhibitor system comprising at least one polyhydroxypolycarboxylic acid and at least one phosphino polymer. The polyhydroxypolycarboxylic acid and/or phosphino polymer may be added to the aqueous system within an aqueous fluid. The aqueous fluid may be or include, but is not limited to, water, brine, seawater, and combinations thereof.

The term "aqueous system" as used herein may refer to a cooling tower (including an open loop cooling tower or a closed loop cooling tower as well as a combination thereof), a cooling water system, and combinations thereof. "Open loop" differs from "closed loop" in that the "open loop" system has recirculating water therethrough. The term encompasses pipes or conduits in which the aqueous fluid may flow through or alongside. Thus, the aqueous system may be included in an oil refinery, a petrochemical or other chemical plant, a thermal power station or a power plant, a steel mill, a natural gas processing plant, a food processing plant, a semi-conductor plants or a HVAC system.

While being referenced herein as a corrosion inhibitor system herein, it is understood that the corrosion inhibitor system may further be effective in the prevention and/or inhibition of scales within the aqueous system.

Corrosion to a metal surface within an aqueous system may be decreased or inhibited by adding at least one polyhydroxypolycarboxylic acid and at least one phosphino polymer to the aqueous system. The addition of the polyhydroxypolycarboxylic acid and phosphino polymer to the aqueous system decreases pitting.

The corrosion inhibitor system defined herein has low toxicity and is biodegradable. It can thus replace conventional corrosion inhibitors and systems that are less environmentally friendly since it is equally effective in reducing corrosion rates of metal alloy surfaces. In an aspect, the corrosion inhibitor system defined herein reduces the corrosion rate of an alloy surface to more than 50% and more typically to more than 80%.

The metal surface may be or include, but is not limited to an iron-containing surface, such as steel; an aluminum-containing surface; carbon steel; special alloys, such as copper alloys; as well as yellow metals as well as combinations thereof.

The corrosion inhibition system may be used in a wide variety of temperatures. In an aspect, for example, the corrosion inhibitor system can be used in temperatures of up to about 225° F.

Further, the corrosion inhibition system defined herein may be used in a pH environment from about 6.5 to about 9.5.

The polyhydroxypolycarboxylic acid(s) and the phosphino polymer may suppress or reduce the amount of corrosion within the aqueous system. Thus, it is not necessary for corrosion to be entirely prevented for the methods and compositions discussed herein to be considered effective, although complete prevention is a desirable goal. Success is obtained if less corrosion and/or scale deposition occurs using the polyhydroxypolycarboxylic acid and the phosphino polymer than in the absence of the polyhydroxypolycarboxylic acid and the phosphino polymer. Alternatively, the methods and treated aqueous systems described are considered successful if there is at least a 50% decrease in corrosion and/or scale deposition within the aqueous system.

The polyhydroxypolycarboxylic acid and the phosphino polymer may be added to the aqueous system at the same time as a component system, or the two components may be added at different times.

Typically, the total amount of polyhydroxypolycarboxylic acid and phosphino polymer in the water system is less than about 40 ppm and is typically between from about 15 to about 30 ppm. The weight ratio of the polyhydroxypolycarboxylic acid to the phosphino polymer within the system to which they are added may range from about 1 to about 1000.

The phosphino polymer is typically water-soluble and characterized by low molecular weight. Typically, the weight average molecular weight of the phosphino polymer is less than 10,000, typically greater than 500. The phosphino group may be pendant to a polymer or be within the polymeric backbone.

Typically, the amount of phosphorus content (as P) introduced into the water system (attributable to the phosphorus in the phosphino polymer) is less than about 1.5 ppm, typically less than about 1 ppm and more typically less than about 0.5 ppm. Since phosphorus may be present in the water system from other sources, typically no more than about 1 ppm of P is present in the water system from other sources of phosphorus.

Exemplary of phosphino polymers are phosphino polycarboxylic acids and phosphino polycarboxylates. In an embodiment, the phosphino polymer is a polycarboxylic acid or polycarboxylate wherein at least one phosphino group is pendant to the polycarboxylic acid or polycarboxylate or is within the backbone of the polymer.

In an embodiment, the polycarboyxlate or polycarboxylic acid may be a homopolymer or copolymer of an $\alpha,\beta$-ethylenically unsaturated acid or ester monomer, such as acrylic acid, methacrylic acid, or lactic acid, a diacid such as maleic acid (or maleic anhydride), itaconic acid, fumaric acid, mesoconic acid, citraconic acid, tartaric acid and the like, monoesters of diacids with alkanols, e.g., having from 1 to about 8 carbons atoms and mixtures thereof. When the carboxylic acid is a copolymer, the other component may be a non-polar group such as styrene or olefinic monomers or a polar functional group such as vinyl acetate, vinyl chloride, vinyl alcohol, alkyl acrylates, vinyl pyridine, vinyl pyrrolidone, acrylamide or acrylamide derivatives, etc. or an ionic functional group such as a polyvinyl sulfonic acid, styrenesulfonic acid, 2-acrylamido-2-methylpropanesulfonic acid (AMPS), vinyl sulfonic acid or vinyl phosphonic acid.

Preferred polymeric polycarboxylates including the homopolymers and copolymers chemically modified such as the phosphino-polyacrylic acids such as those set forth in U.S. Pat. Nos. 4,105,551 and 8,664,418, herein incorporated by reference.

The phosphino polymer may be prepared by after-treating a homopolymer or copolymer or may be copolymerized with one or more of the monomeric units referenced above.

In addition, the phosphino polymer may be a copolymer of a phosphinyl unsaturated monomer and a polymerizable monomer such as any of the monomers referenced above. Examples of phosphinyl monomers include phosphinyl acrylate or phosphinyl methacrylate like (hydroxy)phosphinyl-$C_1$-$C_4$-alkyl (meth)acrylates and (dihydroxy)phosphinyl-$C_1$-$C_4$ alkyl (meth)acrylates and hydroxy phosphino carboxylic acid polymers, such as hydroxyphosphonoacetic acid. Typically, about 1 to about 8 weight percent of the copolymer contains the phosphinyl unsaturated monomer.

In another embodiment, the phosphino polymer is a polyether having phosphino groups attached to aliphatic carbons in chains pendant from the polyether backbone. Such polyethers may have a weight average molecular weight of at least about 50,000 and include those polyethers set forth in U.S. Pat. No. 3,660,314, herein incorporated by reference.

The polyhydroxypolycarboxylic acid may have or include two or more carboxylic acid groups, alternatively from about two to about ten carboxylic acid groups, or from about three to about eight carboxylic acid groups. In a non-limiting embodiment, the polyhydroxypolycarboxylic acid may be or include, but is not limited to, saccharic acid, citric acid, tartaric acid, mucic acid, dehydroxylated dicarboxylic acids, gluconic acid, and combinations thereof. The amount of the polyhydroxypolycarboxylic acid added to the aqueous system may be such that the amount of polyhydroxypolycarboxylic acid in the aqueous system ranges from about 15 ppm to about 500 ppm, alternatively from about 20 ppm independently to about 300 ppm, or from about 50 ppm independently to about 100 ppm.

At least one additional component may be added to the aqueous system at the same time or different time as the polyhydroxypolycarboxylic acid and/or phosphino polymer. Alternatively, the additional component(s) may be present in the aqueous system prior to the addition of the polyhydroxypolycarboxylic acid and/or phosphino polymer. The additional component may be or include, but is not limited to a scale inhibitor, an iron control agent, a dispersant, a biocide, a taggant, a yellow metal corrosion inhibitor, and combinations thereof. The additional component may be present in the aqueous system in an amount ranging from about 1 ppm to about 100 ppm, alternatively from about 5 ppm independently to about 50 ppm, or from about 10 ppm independently to about 25 ppm in another non-limiting embodiment.

The dispersant may include polymeric dispersants such as a polyacrylate, polymaleic anhydride, polyacrylic acid, polyacrylic acid copolymer, polyacrylic acid terpolymer copolymer as well as a copper inhibitor and mixtures thereof.

The scale inhibitor may be or include, but is not limited to, polyacrylates, polymaleates, hydroxypropylacrylates, phosphonates, and combinations thereof. The polyacrylates may be or include homopolymers, copolymers, terpolymers, and combinations thereof.

The biocide may be or include, but is not limited to, sodium hypochlorite (also known as bleach), NaHClO, chlorine dioxide, chlorine, bromine, non-oxidizing biocides, and combinations thereof. Non-limiting examples of the non-oxidizing biocides may be or include isothiazoline; glutaraldehyde; 2,2-dibromo-3-nitrilopropionamide (DBNPA); and combinations thereof.

In a non-limiting embodiment a chemical tag may be attached to at least one of the components for purposes of tracing the component added to or present in the aqueous system, such as the polyhydroxypolycarboxylic acid, the transition metal salt, the biocide, the scale inhibitor, and combinations thereof.

The chemical tag may be or include a fluorophore in a non-limiting embodiment, i.e. a chemical that emits light at a certain wavelength of light. The chemical tag may be or include a tagged polymer, p-toluenesulfonic acid (pTSA), the scale inhibitor itself as a tag and combinations thereof. The chemical tag may emit light at wavelengths ranging from about 180 independently to about 600, or from about 240 independently to about 350.

The chemical tag may be added to the system at the same time or different time from the time that the polyhydroxypolycarboxylic acid and/or phosphino polymer is added. The amount of the chemical tag added to the aqueous system is such that the amount of tag in the system may range from about 1 ppb independently to about 15 ppm and often may be between 500 parts per billion (ppb) independently to about 6 ppm. In a non-limiting embodiment, the tag is pTSA and the amount of pTSA added to the aqueous system is that the within the aqueous system the tag is in the range from about 1 ppb independently to about 4 ppm, or from about 100 ppb independently to about 1 ppm.

While the corrosion inhibitor system is preferably composed of only organic components, a transition metal salt may also be used to the aqueous system. The metal of such salts may be Zn (II), Zn (IV), Sn, Al or Mn, and combinations thereof. The salt may be or include, but is not limited to, chlorides, sulfates, hydroxides, oxides, and combinations thereof. When present, the amount of the transition metal salt to be added to the aqueous system is such that it is present in the aqueous system in an amount ranging from about 0.5 ppm to about 20 ppm.

EXAMPLES

Example 1

FIG. 1 is a graph illustrating the corrosion rates for an aqueous system having 20 ppm mucic acid and 20 ppm saccharic acid. The salts of the carboxylic acids, notably the calcium, potassium, disodium and potassium sodium, were also included in the aqueous system. Each aqueous system was water which included 544 mg/L $Na^+$, 142 mg/L $Ca^{+2}$, 37 mg/L $Mg^{+2}$, 269 mg/L $HCO_3^-$, 540 mg/L and 680 mg/L $SO_4^{-2}$. No pitting was observed.

Example 2

Figure 2:
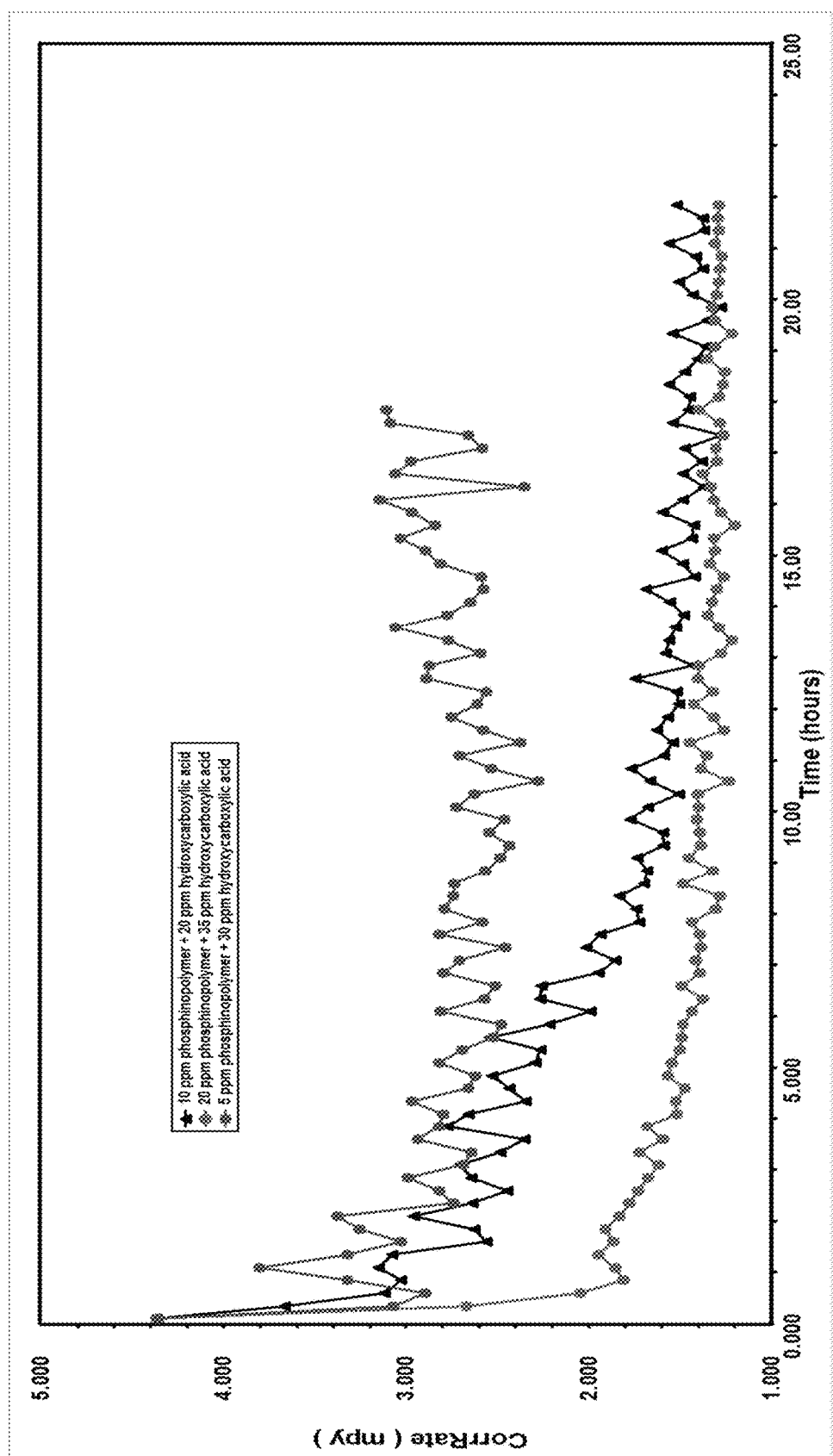
FIG. 2 is a graph illustrating the corrosion rates of formulations containing varying ratios of a phosphino polymer and saccharic acid.

Using the aqueous system of Example 1, the corrosion ratio of a phosphino polymer, and saccharic acid and its salts (calcium, potassium, sodium, disodium and potassium sodium) at different weight ratios was examined. The results are illustrated in FIG. 2. The results indicate the corrosion rate to be lowest using a 1:2 weight ratio of phosphino polymer:polyhydroxypolycarboxylic acid.

Example 3

Figure 3:
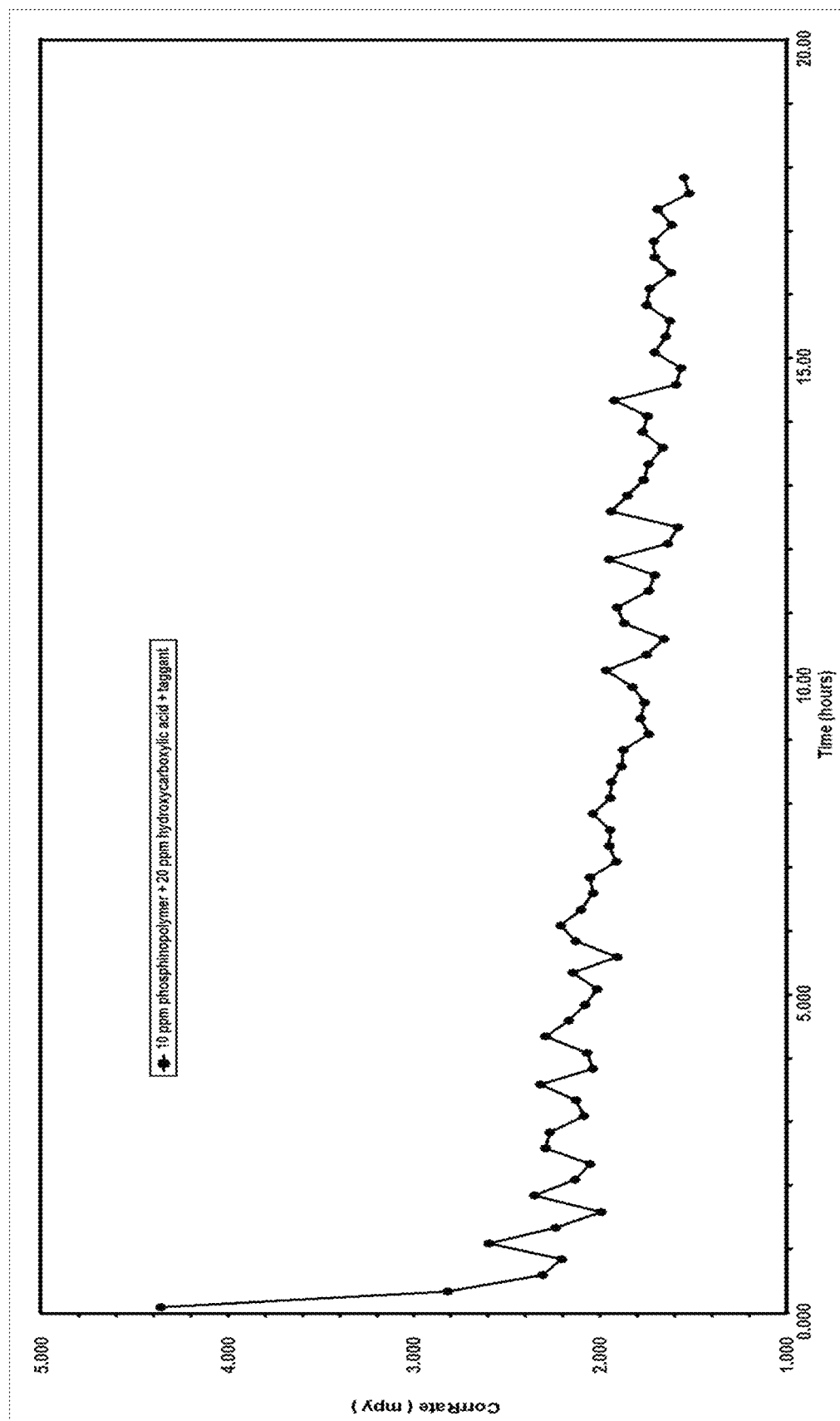
FIG. 3 graphically displays the corrosion rate of a formulation containing a phosphino polymer, saccharic acid and a commercial taggant.

10 ppm of the phosphino polymer in Example 2 was combined with 20 ppm saccharic acid salt and about 10 ppm of Optidose, a commercially available tagged polymer from Dow Chemical Company, in an aqueous system having the same water chemistry as that of Example 1 and Example 2. FIG. 3 shows that tag was still detected after 18 hours at a corrosion rate less than 2 mpy.

In the foregoing specification, a system has been described which is effective in treating cooling water systems to inhibit corrosion as well as prevent scale deposition. However, it will be evident that various modifications and changes can be made thereto without departing from the spirit or teachings of the disclosure as set forth in the appended claims. Accordingly, the specification is to be regarded in an illustrative rather than a restrictive sense.

What is claimed is:

1. A method of inhibiting corrosion in a cooling water system comprising adding to the water system a corrosive inhibiting effective amount of a corrosion inhibitor system free of zinc salts, zinc oxides and zinc sulfates, the corrosion inhibitor system consisting essentially of:

(a) a polycarboxylic acid selected from the group consisting of polyhydroxydicarboxylic acids, polyhydroxytricarboxylic acids or a mixture thereof; and (b) a water soluble phosphino polymer either (i) derived from a phosphinyl unsaturated monomer and an ethylenically unsaturated carboxylic acid or ester; or (ii) a polycarboxylic acid or polycarboxylate having at least one pendant phosphino group or a phosphino group within the backbone of the polymer.

2. The method of claim 1, wherein the water soluble phosphino polymer is a polycarboxylic acid having at least one phosphino group pendant to the polycarboxylic acid.

3. The method of claim 1, wherein at least one of the following prevails:

(a) the weight average molecular weight of the water soluble phosphino polymer is from about 500 to about 10,000; or (b) the amount of phosphorus in the aqueous water system contributed by the phosphino polymer is less than about 1.5 ppm.

4. The method of claim 1, wherein the polyhydroxypolycarboxylic acid is selected from the group consisting of saccharic acid, citric acid, tartaric acid, mucic acid, gluconic acid and combinations thereof.

5. The method of claim 1, wherein the cooling water system is a closed cooling water system, open circulating cooling water system, an air-conditioning water system, a wastewater treatment system, or a deionized water production system.

6. The method of claim 1, wherein the water soluble phosphino polymer is derived from a phosphinyl unsaturated monomer and an ethylenically unsaturated carboxylic acid or ester.

7. The method of claim 6, wherein the ethylenically unsaturated carboxylic acid or ester is selected from the group consisting of acrylic acid, methacrylic acid, lactic acid, maleic acid, maleic anhydride or a dicarboxylic acid of itaconic acid, fumaric acid, mesoconic acid, citraconic acid or tartaric acid or a monoester of the dicarboxylic acid with $C_1$-$C_8$ alkanol, and mixtures thereof.

8. The method of claim 7, wherein the phosphino polymer further comprises styrene, a $C_1$-$C_6$ olefin, vinyl acetate, vinyl chloride, vinyl alcohol, a $C_1$-$C_6$ alkyl acrylate, vinyl pyridine, vinyl pyrrolidone, acrylamide, an acrylamide derivative, a vinyl sulfonic acid, styrenesulfonic acid, 2-acrylamido-2-methylpropanesulfonic acid (AMPS) or vinyl phosphonic acid.

9. The method of claim 6, wherein the phosphinyl unsaturated monomer is a phosphinyl acrylate or phosphinyl methacrylate.

10. The method of claim 9, wherein the phosphinyl acrylate or phosphinyl methacrylate is selected from the group consisting of (hydroxy)phosphinyl-$C_1$-$C_4$-alkyl (meth)acrylates and (dihydroxy)phosphinyl-$C_1$-$C_4$ alkyl (meth)acrylates.

11. The method of claim 6, wherein about 1 to about 8 weight percent of the polymer contains the phosphinyl unsaturated monomer.

12. A method of inhibiting the deposition of scales in a cooling water system comprising adding to the water system a scale inhibiting effective amount of a corrosion inhibitor system composed of only organic components, the corrosion inhibitor system consisting essentially of:

(a) a polyhydroxypolycarboxylic acid selected from the group consisting of polyhydroxydicarboxylic acids, polyhydroxytricarboxylic acids or a mixture thereof; and (b) a water soluble phosphino polycarboxylate.

13. The method of claim 12, wherein either:

(a) the polyhydroxypolycarboxylic acid is added to the cooling water system prior to the addition of the water soluble phosphino polycarboxylate;

(b) the water soluble phosphino polycarboxylate is added to the cooling water system prior to the polyhydroxypolycarboxylic acid; or (c) the polyhydroxypolycarboxylic acid and the water soluble phosphino polycarboxylate are added to the cooling water system at the same time.

14. The method of claim 12, wherein the cooling water system is a closed cooling water system, open circulating cooling water system, an air-conditioning water system, a wastewater treatment system, or a deionized water production system.

15. The method of claim 12, wherein the cooling water system contains at least one component selected from the group consisting of a scale inhibitor, a biocide, a chlorine-containing component, a taggant, a yellow metal corrosion inhibitor, and combinations thereof.

16. The method of claim 12, wherein the pH of fluid in the cooling water system is between from about 6.5 to about 9.5.

17. A method of inhibiting corrosion in a cooling water system comprising adding to the water system a corrosive inhibiting effective amount of a corrosion inhibitor system consisting essentially of:

(a) a polyhydroxypolycarboxylic acid selected from the group consisting of polyhydroxydicarboxylic acids, polyhydroxytricarboxylic acids or a mixture thereof; and (b) a water soluble phosphino polymer.

18. The method of claim 17, wherein at least one of the following conditions prevail:

(a) the water soluble phosphino polymer is derived from a phosphinyl unsaturated monomer and an ethylenically unsaturated carboxylic acid or ester;

(b) the water soluble phosphino polymer is a polycarboxylic acid having at least one phosphino group pendant to the polycarboxylic acid;

(c) the phosphino polymer is a homopolymer or copolymer of an ethylenically unsaturated acid monomer having a phosphino group within the backbone of the polymer;

(d) the weight average molecular weight of the water soluble phosphino polymer is from about 500 to about 10,000;

(e) the amount of phosphorus in the aqueous water system contributed by the phosphino polymer is less than about 1.5 ppm;

(f) the polyhydroxypolycarboxylic acid is selected from the group consisting of saccharic acid, citric acid, tartaric acid, mucic acid, gluconic acid and combinations thereof; or (g) the cooling water system is a closed cooling water system, open circulating cooling water system, an air-conditioning water system, a wastewater treatment system, or a deionized water production system.

* * * * *